United States Patent
Tano et al.

(10) Patent No.: US 10,705,477 B1
(45) Date of Patent: Jul. 7, 2020

(54) CLEANING BLADE, PROCESS CARTRIDGE, AND IMAGE FORMING APPARATUS

(71) Applicant: FUJI XEROX CO., LTD., Tokyo (JP)

(72) Inventors: Daisuke Tano, Kanagawa (JP); Tomoo Matsushima, Kanagawa (JP); Yosuke Tsutsumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/587,817

(22) Filed: Sep. 30, 2019

(30) Foreign Application Priority Data

Apr. 26, 2019 (JP) ................... 2019-085697

(51) Int. Cl.
| | |
|---|---|
| G03G 15/08 | (2006.01) |
| G03G 15/16 | (2006.01) |
| G03G 21/00 | (2006.01) |
| G03G 21/18 | (2006.01) |
| C08G 18/40 | (2006.01) |
| G03G 21/10 | (2006.01) |

(52) U.S. Cl.
CPC ......... *G03G 21/0017* (2013.01); *C08G 18/40* (2013.01); *G03G 15/16* (2013.01); *G03G 21/10* (2013.01); *G03G 21/18* (2013.01)

(58) Field of Classification Search
CPC ............. G03G 15/0812; G03G 15/161; G03G 21/0011; G03G 21/0017
USPC .................. 399/101, 274, 284, 350
See application file for complete search history.

(56) References Cited

U.S. PATENT DOCUMENTS

| | | | | |
|---|---|---|---|---|
| 8,204,424 | B2 * | 6/2012 | Miki et al. | G03G 21/0017 399/350 |
| 8,712,309 | B2 * | 4/2014 | Watanabe et al. | G03G 21/0017 399/350 |
| 9,152,120 | B2 * | 10/2015 | Takahashi | G03G 21/0011 |

FOREIGN PATENT DOCUMENTS

| | | |
|---|---|---|
| JP | 2011-197311 A | 10/2011 |
| JP | 2014-235423 A | 12/2014 |

* cited by examiner

*Primary Examiner* — William J Royer
(74) *Attorney, Agent, or Firm* — Sughrue Mion, PLLC

(57) ABSTRACT

A cleaning blade includes a contact part coming into contact with a member to be cleaned, the contact part being configurated by a member containing polyurethane rubber produced by polymerizing at least a polyol component, which contains over 50 mol % and 75 mol % or less of 1,4-butanediol relative to the entire polyol components, with a polyisocyanate component. The ratio (M100/Re) of 100% modulus (M100 [MPa]) to rebound resilience coefficient (Re [%]) is 0.25 or more. The rebound resilience coefficient (Re [%]) is 25% or more.

14 Claims, 5 Drawing Sheets

CLEANING BLADE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2019-085697 filed Apr. 26, 2019.

BACKGROUND

(i) Technical Field

The present disclosure relates to a cleaning blade, a process cartridge, and an image forming apparatus.

(ii) Related Art

An electrophotographic copying machine, a printer, a facsimile, etc. have used a cleaning blade as a cleaning unit which removes residual toner and the like on the surface of an image holding member such as a photoreceptor or the like.

For example, Japanese Unexamined Patent Application Publication No. 2014-235423 discloses a cleaning blade including a contact part coming into contact with a member to be cleaned, the contact part being configured by a member containing polyurethane rubber produced by polymerizing at least a polyol component, which contains 30 mol % or more and 50 mol % or less of 1,4-butanediol relative to the entire polyol components, with a polyisocyanate component. Further, the ratio (M100/Re) of 100% modulus (M100 [MPa]) to rebound resilience coefficient (Re [%]) is 0.25 or more, and the rebound resilience coefficient (Re [%]) is 25% or more.

SUMMARY

Aspects of non-limiting embodiments of the present disclosure relate to a cleaning blade which suppresses local abrasion as compared with a cleaning blade including a contact part coming into contact with a member to be cleaned, the contact part being configurated by a member containing polyurethane rubber produced by polymerizing at least a polyol component, which contains 50 mol % or less of 1,4-butanediol relative to the entire polyol components, with a polyisocyanate component, and having a ratio (M100/Re) of 100% modulus (M100 [MPa]) to rebound resilience coefficient (Re [%]) or a ratio (EIT/Re) of indentation elastic modulus (EIT [MPa]) to rebound resilience coefficient (Re [%]) of 0.65 or more, and an rebound resilience coefficient (Re [%]) of 25% or more.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cleaning blade including a contact part coming into contact with a member to be cleaned, the contact part being configurated by a member containing polyurethane rubber produced by polymerizing at least a polyol component, which contains over 50 mol % and 75 mol % or less of 1,4-butanediol relative to the entire polyol components, with a polyisocyanate component. Further, the ratio (M100/Re) of 100% modulus (M100 [MPa]) to rebound resilience coefficient (Re [%]) is 0.25 or more, and the rebound resilience coefficient (Re [%]) is 25% or more.

BRIEF DESCRIPTION OF THE DRAWINGS

Exemplary embodiments of the present disclosure will be described in detail based on the following figures, wherein.

DETAILED DESCRIPTION

Figure 1:
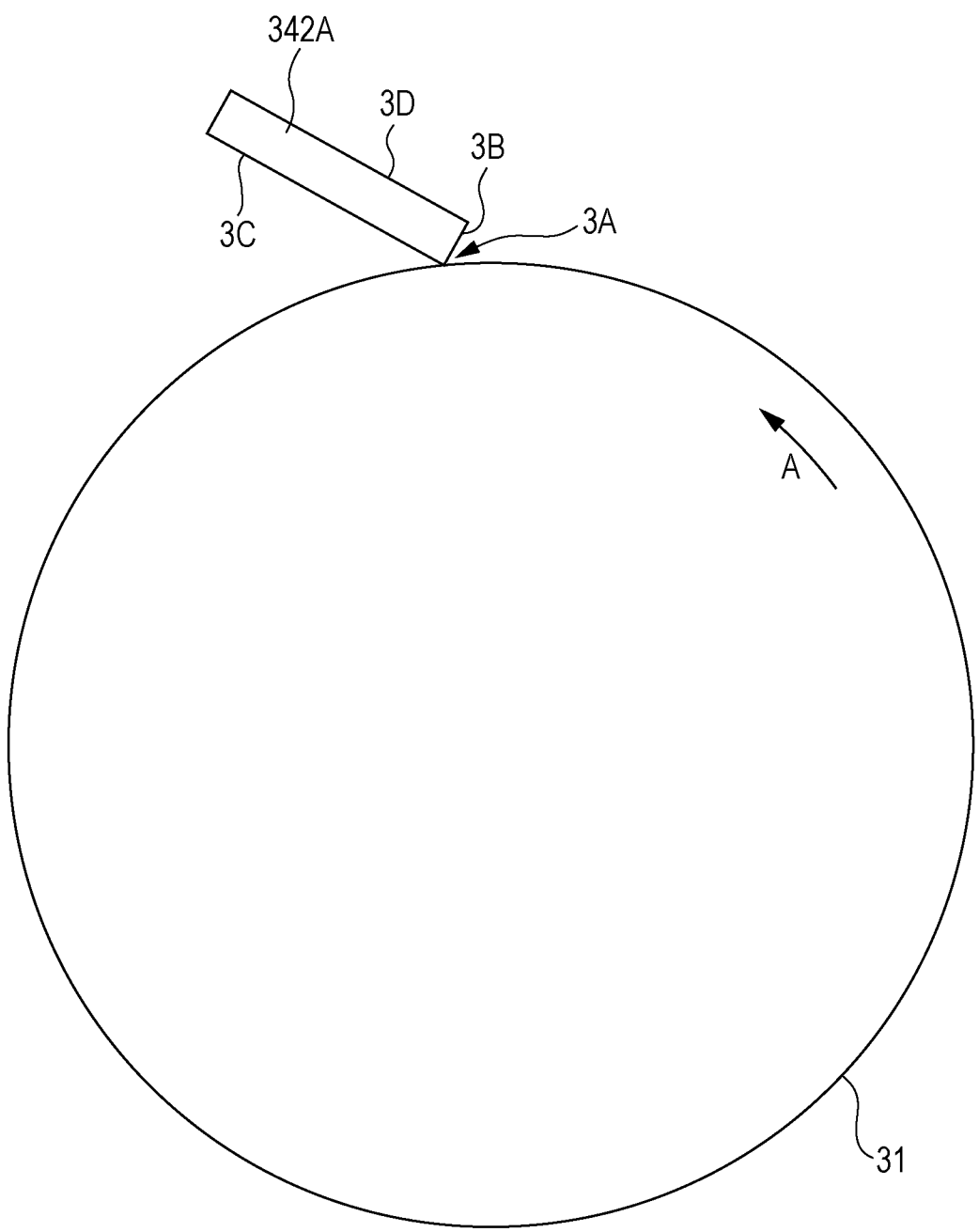
FIG. 1 is a schematic diagram showing an example of a cleaning blade according to an exemplary embodiment of the present disclosure.

Exemplary embodiments of the present disclosure are described in detail below.

<Cleaning Blade>

A cleaning blade according to an exemplary embodiment of the present disclosure includes a contact part coming into contact with a member to be cleaned (simply referred to as a "contact part" hereinafter), the contact part being configurated by a member containing polyurethane rubber produced by polymerizing at least a polyol component, which contains over 50 mol % and 75 mol % or less of 1,4-butanediol relative to the entire polyol component, with a polyisocyanate component.

In addition, the member configurating the contact part satisfies at least one of the following characteristics (1) and (2).

Characteristic (1): the ratio (M100/Re) of 100% modulus (M100 [MPa]) to rebound resilience coefficient (Re [%]) is 0.25 or more, and the rebound resilience coefficient (Re [%]) is 25% or more.

Characteristic (2): the ratio (EIT/Re) of indentation elastic modulus (EIT [MPa]) to rebound resilience coefficient (Re [%]) is 0.65 or more, and the rebound resilience coefficient (Re [%]) is 25% or more.

The cleaning blade according to the exemplary embodiment of the present disclosure having the configuration described above thus suppresses local abrasion.

A cleaning blade used in an image forming apparatus cleans by sliding on a member to be cleaned (image holding member or the like), and thus a contact part with the member to be cleaned is gradually abraded or chipped, thereby causing a cleaning defect.

On the other hand, in view of low cost, there is demand for using a member which contains polyurethane rubber using 1,4-dutanediol as a member configurating the contact part of the cleaning blade.

However, the member containing polyurethane rubber using 1,4-butanediol tends to be poor in the resistance to abrasion and chipping. In particular, urethane rubber using 30 mol % or more of 1,4-butanediol relative to the entire polyol components is applied, the member containing this rubber tends to be poor in the resistance to abrasion and chipping.

In this respect, the cleaning blade described in Japanese Unexamined Patent Application Publication No. 2014-235423 is excellent in both the abrasion resistance and the chipping resistance even when the cleaning blade includes the contact part configured by the member containing polyurethane rubber using 1,4-butanediol.

However, the cleaning blade described in Japanese Unexamined Patent Application Publication No. 2014-235423 may cause local abrasion. The reason for this is supposed as follows: The cleaning blade described in Japanese Unexamined Patent Application Publication No. 2014-235423 contains 50 mol % to 70 mol % of a polyol component other than 1,4-butanediol, and thus the growth of a hard segment composed of 1,4-butanediol, which is a chain extender of urethane, is inhibited. Therefore, the friction coefficient of the surface of the contact part containing urethane rubber cannot be decreased, thereby destabilizing blade behaviors. Thus, local abrasion is supposed to occur.

On the other hand, the cleaning blade according to the exemplary embodiment uses the polyurethane rubber produced by polymerizing at least the polyol component, which contains over 50 mol % and 75 mol % or less of 1,4-butandiol relative to the entire polyol component, with the polyisocyanate component. Therefore, the amount of a polyol component other than 1,4-butanediol is decreased. Thus, the inhibition of growth of a hard segment composed of 1,4-butanediol is supposed to be suppressed. As a result, it is supposed that the friction coefficient of the surface of the contact part containing the urethane rubber is decreased, thereby stabilizing blade behaviors.

Therefore, it is supposed that the cleaning blade according to the exemplary embodiment suppresses local abrasion.

In addition, in the cleaning blade according to the exemplary embodiment, the member constituting the contact part satisfies at least one of the characteristics (1) and (2) described above, thereby causing both the excellent abrasion resistance and chipping resistance.

Further, the cleaning blade according to the exemplary embodiment suppresses the cleaning defect (for example, an image defect such as color streaks or the like) caused by local abrasion of the cleaning blade.

The M100/Re ratio, EIT/Re ratio, and the rebound resilience coefficient of the member containing polyurethane rubber are adjusted within the respective ranges described above by selecting the type and amount of each of the polymerization components of polyurethane rubber and selecting production conditions.

The configuration of the cleaning blade according to the exemplary embodiment of the present disclosure is described below.

The cleaning blade according to the exemplary embodiment of the present disclosure may include, in at least the contact part with a member to be cleaned, a member (referred to as a "contact member" hereinafter) containing polyurethane rubber and satisfying the characteristics described above. That is, the cleaning blade may have a two-layer configuration including a first layer, composed of the contact member and coming into contact with the member to be cleaned, and a second layer provided as a back layer on the back of the first layer, or a configuration including three or more layers. Also, the cleaning blade may have a configuration in which only a corner of a portion coming into contact with the member to be cleaned is composed of the contact member, and the periphery thereof is composed of another material.

Next, the configuration of the cleaning blade according to the exemplary embodiment of the present disclosure is described in further detail below by using the drawings.

Figure 2:
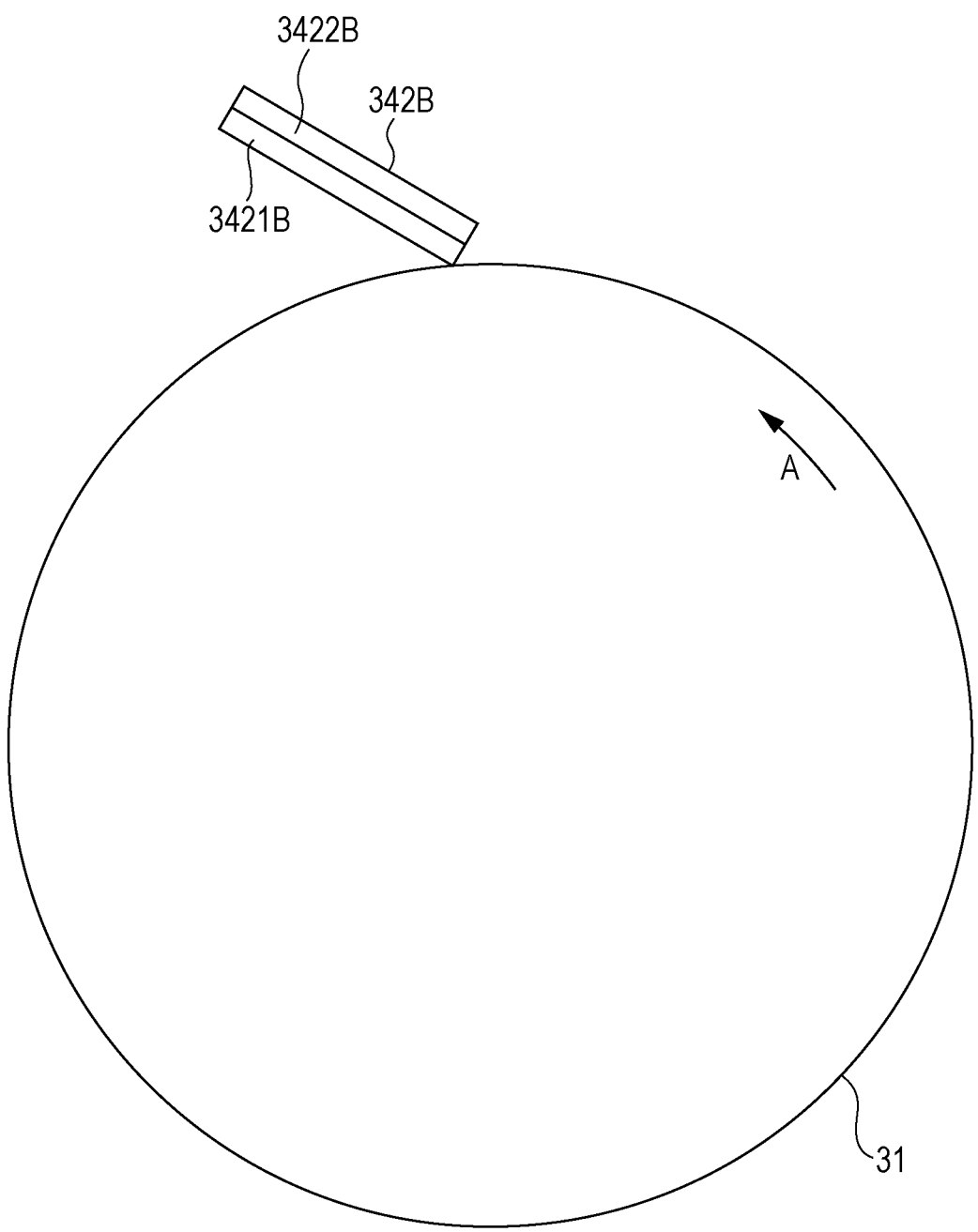
FIG. 2 is a schematic diagram showing another example of a cleaning blade according to an exemplary embodiment of the present disclosure.
Figure 3:
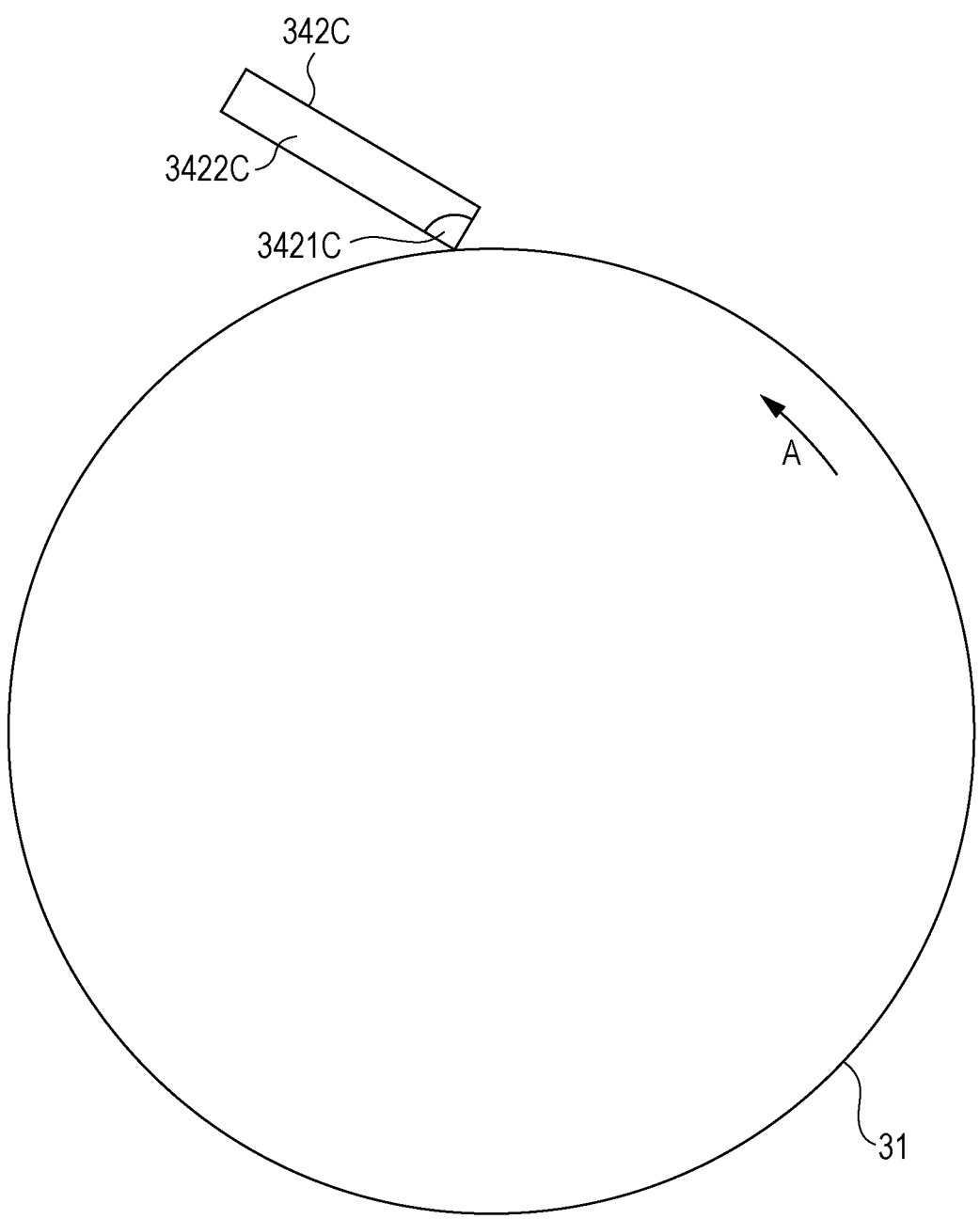
FIG. 3 is a schematic diagram showing a further example of a cleaning blade according to an exemplary embodiment of the present disclosure.

FIG. 1 is a schematic diagram showing a cleaning blade 342A according to a first exemplary embodiment in the state of coming into contact with the surface of a member to be cleaned (for example, an image holding member). FIG. 2 is a diagram showing a cleaning blade 342B according to a second exemplary embodiment in the state of coming into contact with the surface of a member to be cleaned (for example, an image holding member). FIG. 3 is a diagram showing a cleaning blade 342C according to a third exemplary embodiment in the state of coming into contact with the surface of a member to be cleaned (for example, an image holding member).

First, each of the parts of the cleaning blade is described by using FIG. 1. As shown in FIG. 1, the cleaning blade has a contact part (contact corner part) 3A which cleans the surface of an image holding member (photoreceptor drum) 31 by coming into contact with the image holding member 31 driven, a front end surface 3B having one side configurated by the contact corner part 3A and facing the upstream side in the drive direction (arrow A direction), a ventral surface 3C having one side configured by the contact corner part 3A and facing the downstream side in the drive direction (arrow A direction), and a back surface 3D having one side common to the front end surface 3B and opposing the ventral surface 3C.

In addition, the direction parallel to the contact corner part 3A is referred to as the "depth direction", the direction from the contact corner part 3A to the side where the front end surface 3B is formed is referred to as the "thickness direction", and the direction from the contact corner part 3A to the side where the ventral surface 3C is formed is referred to as the "width direction".

The cleaning blade 342A according to the first embodiment shown in FIG. 1 is composed of a single material over the entire region including a portion (contact corner part) 3A coming into contact with the photoreceptor drum 31; that is, a configuration including only a contact member.

In addition, as in the second embodiment shown in FIG. 2, The cleaning blade 342B according to the exemplary embodiment of the present disclosure may have a two-layer configuration including a first layer 3421B which contains a portion, that is, the contact corner part 3A, coming into contact with the photoreceptor drum 31, and which is formed over the entire region on the ventral surface 3C side and composed of a contact member, and a second layer 3422B which is formed as a back surface layer on the back surface 3D side of the first layer and composed of a material different from the contact member.

Further, as in the third embodiment shown in FIG. 3, the cleaning blade 342C according to the exemplary embodiment of the present disclosure may have a configuration including a contact member (edge member) 3421C which contains a portion, that is, the contact corner part 3A, coming into contact with the photoreceptor drum 31, which has a shape in which a quarter-cut cylinder extends in the depth direction and the right-angle portion forms the contact corner part 3A, and which is composed of a contact member, and a back surface member 3422C which is composed of a material different from the contact member and formed to cover the back surface 3D side in the thickness direction of the contact member 3421C and the side opposite to the front end surface 3B in the width direction, that is, constitute a portion other than the contact member 3421C.

FIG. 3 shows an example in which the contact member is a member having a quarter-cut cylinder shape, but the contact member is not limited to this. The contact member may have, for example, the shape of a quarter-cut elliptic cylinder, or the shape of a square quadratic prism, a rectangular quadratic prism, or the like.

In addition, the cleaning blade is generally used by being bonded to a rigid plate-shape support material.

—Composition of Contact Member—

The contact member of the cleaning blade according to the exemplary embodiment of the present disclosure contains polyurethane rubber. In addition, the contact member satisfies at least one of the characteristics (1) and (2) described above.

Polyurethane Rubber

The polyurethane rubber is polyurethane rubber produced by polymerizing at least a polyol component and a polyisocyanate component. If required, the polyurethane rubber may be polyurethane rubber produced by polymerizing, other than the polyol component, a resin having a functional group reactable with an isocyanate group of polyisocyanate.

The polyurethane rubber preferably has a hard segment and a soft segment. The terms "hard segment" and "soft segment" represent that of the polyurethane rubber materials, the material constituting the former segment is relatively harder than the material constituting the latter segment, and the material constituting the latter segment is relatively softer than the material constituting the former segment.

Examples of the material (hard segment material) constituting the hard segment include a low-molecular polyol component among polyol components, a resin having a functional group reactable with an isocyanate group of polyisocyanate, and the like. Examples of the material (soft segment material) constituting the soft segment include a high-molecular polyol component among polyol components.

The aggregates of the hard segment preferably have an average particle diameter of 1 μm or more and 10 μm or less and more preferably 1 μm or more and 5 μm or less.

When the aggregates of the hard segment have an average particle diameter of 1 μm or more, the frictional resistance of the surface of the contact member can be easily decreased. Therefore, the blade behaviors are stabilized, and thus local abrasion can be easily suppressed.

While when the aggregates of the hard segment have an average particle diameter of 10 μm or less, the occurrence of chipping can be easily suppressed.

The average particle diameter of the aggregates of the hard segment is measured as follows. An image is photographed at a magnification of ×20 by using a polarization microscope (BX51-P manufactured by Olympus Corporation), and the image is binarized by image processing. The particle diameters (equivalent circle diameter) of aggregates are measured at five points (particle diameters of 5 aggregates per point) of each of 20 cleaning blades, and the average particle diameter of a total of 500 aggregates is calculated.

In this case, the image is binarized by using image processing software OLYMPUS Stream essentials (manufactured by Olympus Corporation), and the hue/saturation/lightness threshold values are adjusted so that a crystal portion and a hard segment aggregate are black, and an amorphous portion (corresponding to the soft segment) is white.

Polyol Component

The polyol components contain a high-molecular polyol and a low-molecular polyol.

The high-molecular polyol component is polyol having a number-average molecular weight of 500 or more (preferably 500 or more and 5,000 or less). Examples of the high-molecular polyol component include known polyols such as a polyester polyol produced by dehydration condensation of a low-molecular polyol with a dibasic acid, a polycarbonate polyol produced by reaction of a low-molecular polyol with alkyl carbonate, a polycaprolactone polyol, a polyether polyol, and the like. Examples of commercial products of the high-molecular polyol include Placcel 205 and Placcel 240 manufactured by Daicel Corporation.

The number-average molecular weight is the value measured by gel permeation chromatography (GPC). The same applies hereinafter.

These high-molecular polyols may be used alone or in combination of two or more.

The polymerization ratio of the high-molecular polyol is 30 mol % or more and 50 mol % or less and preferably 40 mol % or more and 50 mol % or less relative to the total polymerization components of the polyurethane rubber.

The low-molecular polyol component is polyol having a molecular weight (number-average molecular weight) of less than 500. The low-molecular polyol is a material functioning as a chain extender and a crosslinking agent.

As the low-molecular polyol, 1,4-butanediol is applied. The ratio of 1,4-dutanediol is over 50 mol % and 75 mol % or less (preferably 52 mol % or more and 75 mol % or less, more preferably 55 mol % or more and 75 mol % or less, and still more preferably 55 mol % or more and 60 mol % or less) relative to the total polyol components (high-molecular polyol+low-molecular polyol).

When the ratio of 1,4-butanediol exceeds 50 mol %, local abrasion is suppressed. While when the ratio of 1,4-butanediol is 75 mol % or less, the occurrence of chipping is suppressed.

The ratio of 1,4-butanediol to the total low-molecular polyol component is 80 mol % or more, preferably 90 mol % or more, and still more preferably 100 mol %. That is, it is most preferred to use 1,4-butanedil as the total low-molecular polyol component.

Examples of the low-molecular polyol component other than 1,4-butanediol include a diols (difunctional), a triol (trifunctinal), a tetraol (tetrafunctional), and the like, which are known as a chain extender and a crosslinking agent.

These polyols other than 1,4-butanediol may be used alone or in combination of two or more.

The polymerization ratio of the low-molecular polyol component is over 50 mol % and 75 mol % or less, preferably 52 mol % or more and 75 mol % or less, more preferably 55 mol % or more and 75 mol % or less, and still more preferably 55 mol % or more and 60 mol % or less relative to the total polymerization components of the polyurethane rubber.

Polyisocyanate Component

Examples of the polyisocyanate component include 4,4'-diphenylmethane diisocyanate (MDI), 2,6-toluene diisocyanate (TDI), 1,6-hexanediisocyanate (HDI), 1,5-naphthalene diisocyanate (NDI), 3,3-dimethylphenyl-4,4-diisocyanate (TODI), and the like.

The polyisocyanate component is more preferably 4,4'-diphenylmethane diisocyanate (MDI), 1,5-naphthalene diisocyanate (NDI), or hexamethyl diisocyanate (HDI).

These polyisocyanate components may be used alone or in combination or two or more.

The polymerization ratio of the polyisocyanate component is 5 mol % or more and 25 mol % or less and preferably 10 mol % or more and 20 mol % or less relative to the total polymerization components of the polyurethane rubber.

Resin Having Functional Group Reactable with Isocyanate Group

The resin having a functional group reactable with an isocyanate group (referred to as the "functional group-containing resin" hereinafter) is preferably a flexible resin and, in view of flexibility, it is more preferably an aliphatic resin having a linear structure. Examples of the functional group-containing resin include an acrylic resin having two or more hydroxyl groups, a polybutadiene resin having two or more hydroxyl groups, an epoxy resin having two or more epoxy groups, and the like.

Examples of commercial products of an acrylic resin having two or more hydroxyl groups include Actflow (grade: UMB-2005B, UMB-2005P, UMB-2005, UME-2005, and the like) manufactured by Soken Chemical Engineering Co., Ltd.

Examples of commercial products of a polybutadiene resin having two or more hydroxyl groups include R-45HT and the like manufactured by Idemitsu Kosan Co., Ltd.

An epoxy resin having two or more epoxy groups preferably has higher flexibility and toughness than usual epoxy resins, but not has hard and fragile properties unlike usual general epoxy resins. Of example, in view of the molecular structure, the epoxy resin preferably has, in the middle of a main chain structure, a structure (flexible skeleton) which can increase the mobility of the main chain. Examples of the flexible skeleton include an alkylene skeleton, a cycloalkane skeleton, a polyoxyalkylene skeleton, and the like, and a polyoxyalkylene skeleton is particularly preferred.

In respect of the physical properties, the epoxy resin preferably has low viscosity relative to the molecular weight as compared with usual epoxy resins. Specifically, the weight-average molecular weight is preferably within a range of 900±100, and the viscosity at 25° C. is preferably within a range of 15000±5000 mPa·s and more preferably within a range of 15000±3000 mPa·s. Examples of commercial products of the epoxy resin having these characteristics include EPLICON EXA-4850-150 and the like manufactured by DIC Corporation.

The polymerization ratio of the functional group-containing resin is within a range which does not impair the effect of the cleaning blade according to the exemplary embodiment of the present disclosure.

Method for Producing Polyurethane Rubber

The polyurethane rubber is produced by a general method for producing polyurethane, such as a prepolymer method, a one-shot method, or the like. The prepolymer method is preferred for the exemplary embodiment of the present disclosure because polyurethane rubber having excellent abrasion resistance and chipping resistance can be produced, but the production method is not limited.

The cleaning blade is formed by molding a composition for forming the cleaning blade, which is prepared by the method described above, into a sheet shape by using, for example, centrifugal molding, extrusion molding, or the like, and then subjected to cutting or the like.

In this case, examples of the catalyst used for producing the polyurethane rubber include amine-based compounds such as tertiary amine and the like, quaternary ammonium salts, organic metal compounds such as organic tin compounds and the like.

Examples of the tertiary amine include trialkylamines such as triethylamine and the like; tetraalkyldiamines such as N,N,N',N'-tetramethyl-1,3-butanediamine and the like; aminoalcohols such as dimethyl ethanolamine and the like; ester amines such as ethoxylated amines, ethoxylated diamines, bis(diethylethanolamine) adipate, and the like; cyclohexylamine derivatives such as triethylenediamine (TEDA), N,N-dimethylcyclohexylamine, and the like; morpholine derivatives such as N-methylmorpholine, N-(2-hydroxypropyl)-dimethylmorpholine, and the like; piperazine derivatives such as N,N'-diethyl-2-methylpiperazine, N,N'-bis-(2-hydroxypropyl)-2-methylpiperazine, and the like; and the like.

Examples of quaternary ammonium salts include 2-hydroxypropyl trimethylammonium octylate salts, 1,5-diazabicyclo[4.3.0]nonene-5(DBN) octylate salts, 1,8-diazabicyclo[5.4.0]undecene-7(DBU)-octylate salts, DBU-oleate salts, DBU-p-toluenesulfonate salts, DBU-formate salts, 2-hydroxypropyl trimethylammonium formate salts, and the like.

Examples of organic tin compounds include dialkyltin compounds such as dibutyltin dilaurate, dibutyltin di(2-ethylhexoate), and the like; stannous 2-ethylcapronate, stannous oleate, and the like.

Among these catalysts, triethylenediamine (TEDA) as a tertiary ammonium salt is preferably used in view of hydrolysis resistance, and a quaternary ammonium salt is preferably used in view of processability. Among the quaternary ammonium salts, 1,5-diazabicyclo[4.3.0]nonene-5(DBN) octylate salts, 1,8-diazabicyclo[5.4.0]undecene-7(DBU)-octylate salts, and DBU-formate salts, which have high reaction activity, are preferably used.

The content of the catalyst is preferably within a range of 0.0005% by mass or more and 0.03% by mass or less and particularly preferably 0.001% by mass or more and 0.01% by mass or less relative to the whole urethane rubber constituting the contact member.

These can be used alone or in combination of two or more.

—Physical Properties of Contact Member—

The M100/Re ratio (ratio of 100% modulus (M100 [MPa]) to rebound resilience coefficient (Re [%]) of the contact part) of the contact member (polyurethane rubber member) is 0.25 or more, preferably 0.28 or more, and more preferably 0.3 or more. In view of chipping resistance, the upper limit of the M100/Re ratio of the contact member is preferably 1.0 or less and more preferably 0.9 or less.

The EIT/Re ratio (ratio of indentation elastic modulus (EIT [MPa]) to rebound resilience coefficient (Re [%]) of the contact member (polyurethane rubber member) is 0.65 or more, preferably 0.75 or more, and more preferably 0.85 or more. In view of chipping resistance, the upper limit of the EIT/Re ratio of the contact member is preferably 1.1 or less and more preferably 1.0 or less.

The rebound resilience coefficient (Re [%]) of the contact member (polyurethane rubber member) is 25% or more, preferably 28% or more, and more preferably 30% or more. In view of the suppression of blade squealing and the abrasion resistance, the upper limit of rebound resilience coefficient (Re [%]) of the contact part is preferably 60% or less and more preferably 40% or less.

In view of abrasion resistance and chipping resistance, the 100% modulus (M100 [MPa]) of the contact member (polyurethane rubber member) is preferably 4 MPa or more and 10 MPa or less and more preferably 5 MPa or more and 9 MPa or less.

In view of the abrasion resistance and chipping resistance, the indentation elastic modulus (EIT [MPa]) of the contact member (polyurethane rubber member) is preferably 10 MPa or more and 30 MPa or less more preferably 15 MPa or more and 25 MPa or less.

The 100% modulus (M100 [MPa]), indentation elastic modulus (EIT [MPa]), and rebound resilience coefficient (Re [%]) are the values measured by the methods described above in examples described later.

The weight-average molecular weight of the contact member (polyurethane rubber member) is 1000 or more and 4000 or less and preferably 1500 or more and 3500 or less.

—Composition of Non-Contact Member—

Next, when as in the second embodiment shown in FIG. 2 and the third embodiment shown in FIG. 3, the cleaning blade according to the exemplary embodiment of the present disclosure includes the contact member and a region (non-contact member) other than the contact member, which are composed of respective different materials, the composition of the non-contact member is described.

The non-contact member is not particularly limited as long as it has the function of supporting the contact member, and any known material can be used. Examples of a material used for the non-contact member include polyurethane rubber, silicone rubber, fluororubber, chloroprene rubber, butadiene rubber, and the like. Among these, polyurethane rubber is preferred. Examples of the polyurethane rubber ester-based polyurethane and ether-based polyurethane, and the ester-based polyurethane is preferred.

—Production of Cleaning Blade—

In the case of the cleaning blade composed of only the contact part shown in FIG. 1, the cleaning blade is produced by the method of molding the contact member described above.

In the case of the cleaning blade having a plural-layer configuration such as the two-layer configuration shown in FIG. 2 or the like, the cleaning blade is produced by bonding together the first layer as the contact member and the second layer (plural layers in a layer configuration including three or more layers) as the non-contact member. The bonding method preferably uses a double-sided tape, various adhesives, or the like. Also, plural layers may be bonded together by pouring materials the layers into a mold while making a time difference during molding and bonding together the materials without providing an adhesive layer.

In the case of a configuration having the contact member (edge member) and the non-contact member (back surface member) shown in FIG. 3, prepared are a first mold which has a cavity (region into which the composition for forming the contact member is poured) corresponding to a semicylindrical shape formed by overlappping the ventral surface 3C sides of two contact members 3421C shown in FIG. 3, and a second mold which has a cavity corresponding to a shape formed by overlapping the ventral surface 3C sides of two parts each having the contact member 3421C and the non-contact member 3422C shown in FIG. 3. The composition for forming the contact member is poured into the cavity of the first mold and cured to form a first molded product having a shape in which the two contact members 3421C are overlapped each other. Next, the first mold is removed, and then the second mold is installed so that the first molded product is disposed in the cavity of the second mold. Then, a composition for forming the non-contact member is poured into the cavity of the second mold so as to cover the first molded product and then cured, forming a second molded product having a shape in which the ventral surface 3C sides of two contact members 3421C and two non-contact members 3422C are overlapped each other. Next, the formed second molded product is cut at the center, that is, at the portion serving as the ventral surface 3C, so that the semicylindrical contact member is cut at the center to form a quarter cut cylindrical shape. The product is further cut into predetermined dimensions to produce the cleaning blade shown in FIG. 3.

—Application of Cleaning Blade—

When the member to be cleaned is cleaned by using the cleaning blade according to the exemplary embodiment of the present disclosure, the member to be cleaned, which is an object of cleaning, is not particularly limited as long as the member has a surface required to be cleaned in an image forming apparatus. Examples thereof include an intermediate transfer body, a charging roller, a transfer roller, a transfer material transport belt, a paper transport roller, a detoning roller which further removes toner from a cleaning brush which removes toner from an image holding member, and the like. In the exemplary embodiment of the present disclosure, the image holding member is particularly preferred. The cleaning blade according to the exemplary embodiment of the present disclosure may be one which cleans a member, as the member to be cleaned, other than a member for an image forming member.

(Cleaning Device, Process Cartridge, and Image Forming Apparatus)

Next, described are a cleaning device, a process cartridge, and an image forming apparatus each using the cleaning blade according to the exemplary embodiment of the present disclosure.

A cleaning device according to an exemplary embodiment of the present disclosure is not particularly limited as long as the cleaning blade according to the exemplary embodiment of the present disclosure is provided as a cleaning blade which cleans the surface of a member to be cleaned by coming into contact with the surface of the member to be cleaned. A configuration example of the cleaning device is, for example, a configuration in which the cleaning blade is fixed in a cleaning case having an opening on the side of the member to be cleaned so that the edge tip is disposed on the opening portion side, and a transport member is provided for guiding, to a foreign material recovering container, the foreign materials such as waste toner and the like recovered from the surface of the member to be cleaned by the cleaning blade. Also, the cleaning device according to the exemplary embodiment of the present disclosure may use two or more cleaning blades according to the exemplary embodiment of the present disclosure.

When the cleaning blade according to the exemplary embodiment of the present disclosure is used for cleaning the image holding member, in order to suppress an image flow during image formation, the force NF (normal force) to push the cleaning blade against the image holding member is preferably within a range of 1.3 gf/mm or more 2.3 gf/mm or less and more preferably within a range of 1.6 gf/mm or more and 2.0 gf/mm or less.

In addition, the biting length of the cleaning blade tip part into the image holding member is preferably within a range of 0.8 mm or more and 1.2 mm or less and more preferably within a range of 0.9 mm or more and 1.1 mm or less.

The angle W/A (working angle) of the contact part between the cleaning blade and the image holding member is preferably within a range of 8° or more and 14° or less and more preferably within a range of 10° or more and 12° or less.

A process cartridge according to an exemplary embodiment of the present disclosure is not particularly limited as long as the cleaning device according to the exemplary embodiment of the present disclosure is provided as a cleaning device which cleans the surfaces of one or more members to be cleaned, such as an image holding member, an intermediate transfer body, and the like, by coming into contact with the surfaces of the members to be cleaned. The process cartridge has, for example, a form including the image holding member and the cleaning device according to the exemplary embodiment of the present disclosure, which cleans the surface of the image holding member, the process cartridge being detachable from the image forming apparatus. For example, in a so-called tandem machine having an image holding member corresponding to each color toner, the cleaning device according to the exemplary embodiment may be provided on each of the image holding members. In addition, the cleaning device according to the exemplary embodiment may be used in combination with a cleaning brush or the like.

—Examples of Cleaning Blade, Image Forming Apparatus, and Cleaning Device—

Next, examples of the cleaning blade according to the exemplary embodiment of the present disclosure and of the image forming apparatus and cleaning device each using the cleaning blade are described in further detail by using the drawings.

Figure 4:
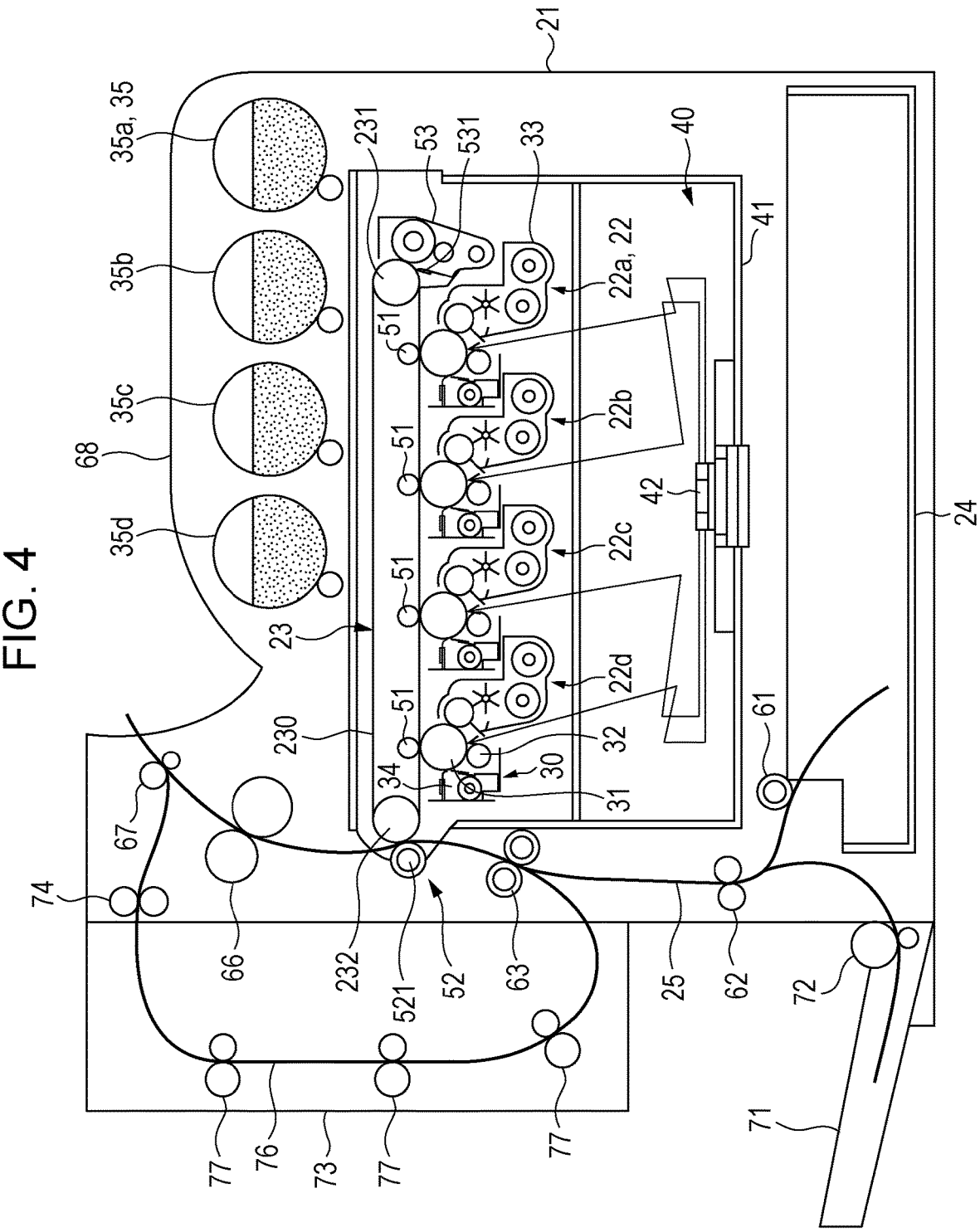
FIG. 4 is a schematic configuration diagram showing an example of an image forming apparatus according to an exemplary embodiment of the present disclosure.

FIG. 4 is a schematic diagram showing an example of the imaging forming apparatus according to the exemplary embodiment of the present disclosure and showing a so-called tandem-type image forming apparatus.

In FIG. 4, reference numeral 21 denotes a body housing, reference numerals 22, 22a to 22d, each denotes an image forming unit, reference numeral 23 denotes a belt module, reference numeral 24 denotes a recording medium supply cassette, reference numeral 25 denotes a recording medium transport path, reference numeral 30 denotes a photoreceptor unit, reference numeral 31 denotes a photoreceptor drum, reference numeral 33 denotes a developing unit, reference numeral 34 denotes a cleaning device, reference numerals 35, 35a to 35d, each denote a toner cartridge, reference numeral 40 denotes an exposure unit, reference numeral 41 denotes a unit case, reference numeral 42 denotes a polygon mirror, reference numeral 51 denotes a first transfer device, reference numeral 52 denotes a second transfer device, reference numeral 53 denotes a belt cleaning device, reference numeral 61 denotes a feed roller, reference numeral 62 denotes a transport roller, reference numeral 63 denotes a registration roller, reference numeral 66 denotes a fixing device, reference numeral 67 denotes a discharge roller, reference numeral 68 denotes a delivery part, reference numeral 71 denotes a manual feeding device, reference numeral 72 denotes a feed roller, reference numeral 73 denotes a two-sided recording unit, reference numeral 74 denotes a guide roller, reference numeral 76 denotes an internal recording medium return transport path, reference numeral 77 denotes a transport roller, reference numeral 230 denotes an intermediate transfer belt, reference numerals 231 and 232 each denote a support roller, reference numeral 521 denotes a second transfer roller, and reference numeral 531 denotes a cleaning blade.

The tandem-type image forming apparatus shown in FIG. 4 includes the image forming units 22 (specifically 22a to 22d) of four colors (in the exemplary embodiment, yellow, magenta, cyan, and black) which are arranged in the body housing 21, and the belt module 23 disposed above the image forming units 22 and containing the intermediate transfer belt 230 circularly transported along the arrangement direction of the image forming units 22. On the other hand, the recording medium supply cassette 24 which houses recording media (not shown) such as paper or the like is disposed in a lower portion of the body housing 21, and the recording medium transport path 25 serving as a transport path of the recording medium from the recording medium supply cassette 24 is disposed in the vertical direction.

In the exemplary embodiment of the present disclosure, the image forming units 22 (22a to 22d) form toner images for, for example, yellow, magenta, cyan, and black, respectively, (the arrangement is not necessarily this order) in order from the upstream side in the circulation direction of the intermediate transfer belt 230, and the photoreceptor units 30, the developing units 33, and the common exposure unit 40 are provided.

Each of the photoreceptor units 30 includes a sub-cartridge which integrally houses, for example, the photoreceptor drum 31, a charging device (charging roller) 32, which previously charges the photoreceptor drum 31, and the cleaning device 34 which removes the residual toner on the photoreceptor drum 31.

The developing unit 33 develops the electrostatic latent image formed on the charged photoreceptor drum 31 by exposure by the exposure unit 40 with a corresponding color toner (in the exemplary embodiment, for example, negative polarity) and is integrated with, for example, the sub-cartridge including the photoreceptor unit 30, forming a process cartridge (so-called customer replaceable unit).

Of course, the photoreceptor unit 30 may be provided as a single process cartridge separated from the developing unit 33. In addition, in FIG. 4, reference numerals 35 (35a to 35d) each denote the toner cartridge for supplying a toner of each color component to each of the developing units 33 (through a toner supply route not shown).

On the other hand, the exposure unit 40 includes the unit case 41 which houses, for example, four semiconductor lasers (not shown), the polygon mirror 42, an imaging lens (not shown), and a mirror (not shown) corresponding to each of the photoreceptor units 30. Thus, the light from the semiconductor laser of each color component is deflection-scanned by the polygon mirror 42, and a light image is guided to an exposure point on the corresponding photoreceptor drum 31 through the imaging lens and the mirror.

In the exemplary embodiment of the present disclosure, the belt module 23 includes, for example, the intermediate transfer belt 230 stretched between a pair of support rollers (one of which is a drive roller) 231 and 232, and the first transfer device (in this example, the first transfer roller) 51 is disposed on the back of the intermediate transfer belt 230 corresponding to the photoreceptor drum 31 of each of the photoreceptor unit 30. Therefore, when a voltage with polarity opposite to the charge polarity of a toner is applied to the first transfer device 51, the toner image on the photoreceptor drum 31 is electrostatically transferred to the intermediate transfer belt 230 side. Further, the second transfer device 52 is disposed at a position corresponding to the support roller 232 on the downstream side of the most downstream-side image forming unit 22d of the intermediate transfer belt 230, and the first transferred image on the intermediate transfer belt 230 is second transferred to the recording medium (collective transfer).

In the exemplary embodiment of the present disclosure, the second transfer device 52 includes a second transfer roller 521 disposed in pressure contact with the toner image holding side of the intermediate transfer belt 230, and a back roller (in this example, also serving as the support roller 232) disposed on the back side of the intermediate transfer belt 230 and serving as a counter electrode of the second transfer roller 521. In addition, for example, the second transfer roller 521 is earthed, and a bias with the same polarity as the charge polarity of the toner is applied to the back roller (support roller 232).

Further, the belt cleaning device 53 is disposed on the upstream side of the most upstream-side image forming unit 22a of the intermediate transfer belt 230, and thus the residual toner on the intermediate transfer belt 230 is removed.

In addition, the feed roller 61 which feeds the recording medium is provided on the recording medium supply cassette 24, and the transport roller 62 which feeds the recording medium is disposed immediately behind the feed roller 61. Also, the registration roller 63 is disposed in the recording medium transport path 25 positioned immediately ahead of the second transfer position so that the recording medium is supplied to the second transfer position with predetermined timing. On the other hand, the fixing device 66 is provided in the recording medium transport path 25 on the downstream side of the second transfer position, the discharge roller 67 for discharging the recording medium is provided on the downstream side of the fixing device 66, and the discharged recording medium is housed in the delivery part 68 formed in an upper portion of the body housing 21.

Further, the manual feeding device (MSI) 71 is provided at a side of the body housing 21, and the recording medium on the manual feeding device 71 is delivered to the recording medium transport path 25 by the delivery roller 72 and the transport roller 62.

Further, the two-sided recording unit 73 is attached to the body housing 21. When a two-sided mode is selected for recording images on both sides of the recording medium, the two-sided recording unit 73 takes in the recording medium after one-side recording by reversing the discharge roller 67 and using the guide roller 74 in front of the inlet, and the recording medium is transported by the transport roller 77 along the internal recording medium return transport path 76 and is again supplied to the registration roller 63 side.

Next, the cleaning device 34 disposed in the tandem-type image forming apparatus shown in FIG. 4 is described in detail.

Figure 5:
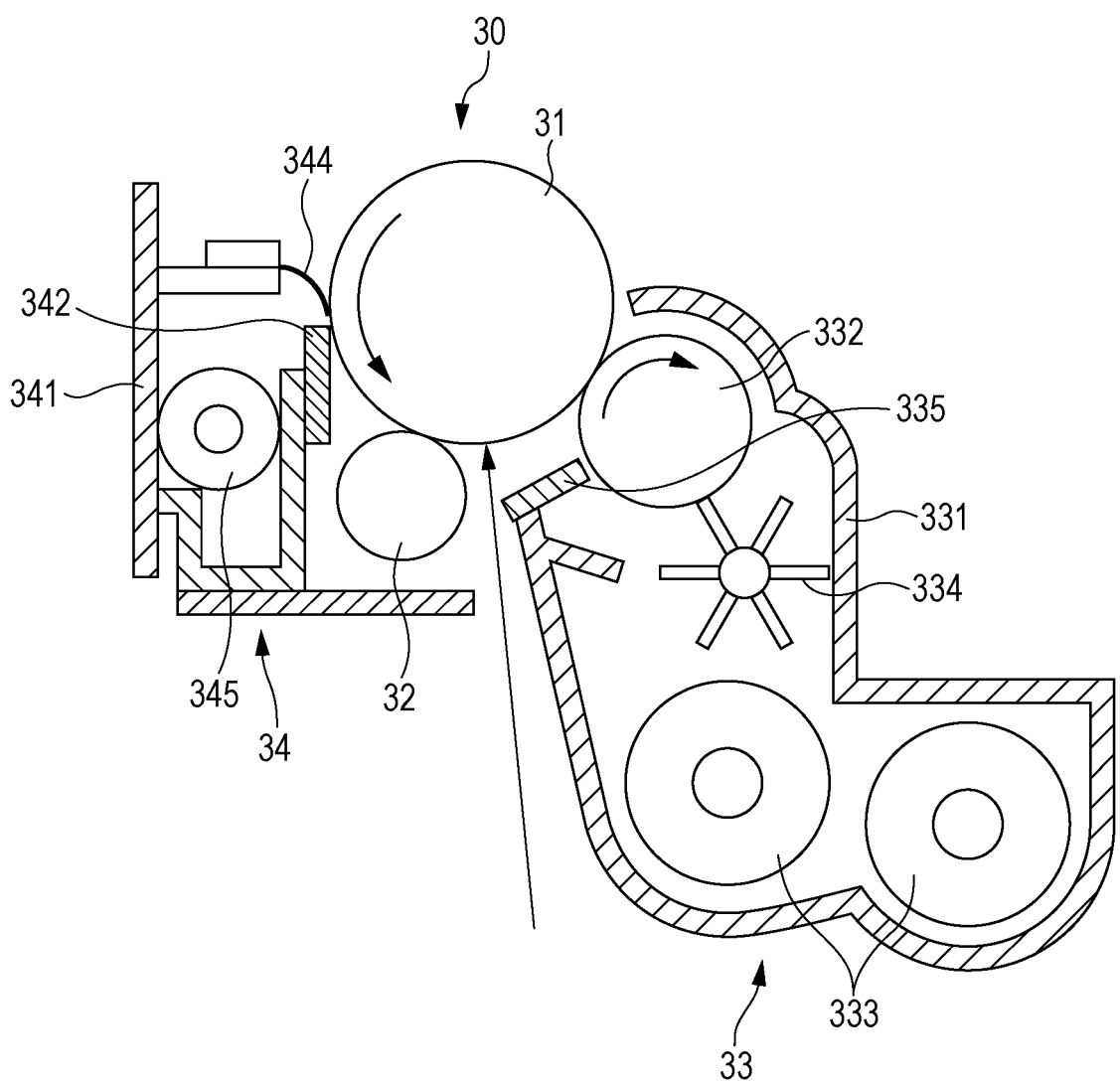
FIG. 5 is a schematic sectional view showing an example of a cleaning device according to an exemplary embodiment of the present disclosure.

FIG. 5 is a schematic sectional view showing an example of the cleaning device according to the exemplary embodiment of the present disclosure, and also showing the photoreceptor drum 31 and the charging roller 32 which are housed in the sub-cartridge together with the cleaning device 34 shown in FIG. 4, and the developing unit 33.

In FIG. 5, reference numeral 32 denotes the charging roller (charging device), reference numeral 331 denotes a unit case, reference numeral 332 denotes a developing roller, reference numeral 333 denotes a toner transport member, reference numeral 334 denotes a transport paddle, reference numeral 335 denotes a trimming member, reference numeral 341 denotes a cleaning case, reference numeral 342 denotes a cleaning blade, reference numeral 344 denotes a film seal, and reference numeral 345 denotes a transport member.

The cleaning device 34 includes the cleaning case 341 which houses the residual toner and having an opening opposite to the photoreceptor drum 31, and the cleaning blade 342 disposed in contact with the photoreceptor drum 31 is attached at the lower edge of the opening of the cleaning case 341 through a bracket (not shown). On the other hand, the film seal 344 is attached at the upper edge of the opening of the cleaning case 341 so as to maintain airtightness between the cleaning device and the photoreceptor drum 31. In addition, reference numeral 345 denotes the transport member which guides the waste toner housed in the cleaning case 341 to a side waste toner container.

Next, the cleaning blade provided on the cleaning device 34 is described in detail by using the drawings.

FIG. 1 is a schematic sectional view showing an example of the cleaning blade according to the exemplary embodiment of the present disclosure, and showing the cleaning blade 342 shown in FIG. 5 together with the photoreceptor drum 31 coming into contact with the cleaning blade 342.

In the exemplary embodiment of the present disclosure, the cleaning blade according to the exemplary embodiment of the present disclosure is used as the cleaning blade 342 in the cleaning device 34 of each of the image forming units 22 (22a to 22d), and the cleaning blade according to the exemplary embodiment of the present disclosure may be used as a cleaning blade 531 used in the belt cleaning device 53.

In addition, as shown in, for example, FIG. 5, the developing unit (developing device) 33 used in the exemplary embodiment of the present disclosure includes a unit case 331 which houses a developer and has an opening opposite to the photoreceptor drum 31. A developing roller 332 is disposed at a position facing the opening of the unit case 331, and a toner transport member 333 for stirring and transporting the developer is disposed in the unit case 331. Further, a transport paddle 334 is disposed between the developing roller 332 and the toner transport member 333.

During development, the developer is supplied to the developing roller 332, and then in the state where the thickness of a developer layer is regulated by, for example, the trimming member 335, the developer is transported to a development region facing the photoreceptor drum 31.

In the exemplary embodiment of the present disclosure, the developing unit 33 uses, for example, a two-component toner containing a toner and a carrier, but a one-component toner containing only a toner may be used.

Next, the operation of the image forming apparatus according to the exemplary embodiment of the present disclosure is described. First, when a single color toner image corresponding to each of the colors is formed by each of the image forming units 22 (22a to 22d), the single color toner images of the respective colors are successively superposed so as to coincide with original information and then first transferred to the surface of the intermediate transfer belt 230. Then, the color toner images transferred to the surface of the intermediate transfer belt 230 are transferred to the surface of the recording medium by the second transfer device 52, and the recording medium to which the color toner images have been transferred is fixed by the fixing device 66 and then discharged to the delivery part 68.

On the other hand, in each of the image forming units 22 (22a to 22d), the residual toner on the photoreceptor drum 31 is cleaned by the cleaning device 34, and the residual toner on the intermediate transfer belt 230 is cleaned by the belt cleaning device 53.

In the image forming process described above, the residual toner is cleaned by the cleaning device 34 (or the belt cleaning device 53).

The cleaning blade 342 may be fixed through a spring material, not fixed directly to a frame member in the cleaning device 34 as shown in FIG. 5.

EXAMPLES

The present disclosure is described below by examples, but the present disclosure is not limited only to these examples. In a description below, "parts" represents "parts by mass".

Examples 1 to 7 and Comparative Examples 1 to 4

A cleaning blade of each of the examples is formed by changing the types and molar ratios of a high-molecular polyol component, low-molecular polyol component, and isocyanate component and changing the curing/maturing conditions according to Table 1. Specifically, the cleaning blade is formed as follows.

First, adipic acid (HOOC—$C_4H_8$—COOH) is polymerized with 1,4-butanediol at 1:1 (molar ratio), and the resultant polymer is treated so that an end is —OH, producing a polyester polyol by polymerization of a linear diol (butanediol) having 4 carbon atoms. The number-average molecular weight of the resultant polyester polyol is 2000.

Next, the polyester polyol as a high-molecular polyol component, 1,4-butanediol (1,4-BD, chain extender) as a low-molecular polyol, and 4,4'-dipheylmethane diisocyanate (MDI, polyisocyanate, manufactured by Nippon Polyurethane Industry Co., Ltd., Millionate MT) as isocyanate, and trimethylolpropane (TMP, manufactured by Mitsubishi Gas Chemical Company, Inc.) as a crosslinking agent are reacted in mixing amounts (molar ratio) shown in Table 1 in a nitrogen atmosphere at 80° C. for 2 hours, preparing a composition A1 for forming a cleaning blade.

Next, the composition A1 for forming a cleaning blade is poured into a centrifugal molding machine with a mold adjusted to 140° C., and cured and then matured by heating under the curing/maturing conditions shown in Table 1. Then, the cooled cured product is cut to produce a cleaning blade having a width of 8 mm and a thickness of 2 mm.

However, in Example 6, polytetramethylene ether glycol (PTMG) is used as the high-molecular polyol component.

The curing/maturing conditions A to E shown inn Table 1 are as follows.

Curing/maturing condition A: curing reaction at 100° C. for 1 hour and then mature heating at 110° C. for 24 hours Curing/maturing condition B: curing reaction at 110° C. for 1 hour and then mature heating at 110° C. for 24 hours Curing/maturing condition C: curing reaction at 110° C. for 2 hours and then mature heating at 110° C. for 48 hours Curing/maturing condition D: curing reaction at 100° C. for 40 minutes and then mature heating at 110° C. for 24 hours Curing/maturing condition E: curing reaction at 100° C. for 40 minutes and then mature heating at 100° C. for 24 hours <Evaluation>

For the cleaning blade formed in each of the examples, the physical properties of the contact part and the characteristics of the blade are evaluated. The results are shown in Table 1.

(Evaluation of Physical Properties of Contact Part)

—100% Modulus (M100)—

The 100% modulus is determined from the stress at a strain of 100% measured at a tensile speed of 500 mm/min by using a dumbbell-shaped No. 3 test piece according to JIS K6251 (2010). The measuring device used is Strograph AE elastomer manufactured by Toyo Seiki Co, Ltd.

—Indentation Elastic Modulus (EIT)—

The indentation elastic modulus (EIT) is determined from the gradient within a load region of 65% to 95% of the maximum load of the unloading curve obtained by unloading in a load-penetration curve of an indenter according to ISO14577 (2002). The measurement conditions are as follows.

Measuring device: nano-indentation method, dynamic micro hardness tester "trade name PICODENTOR HM500" (manufacturer, Fischer Instruments K.K.)"

Intender: conical Berkovich diamond intender having a face angle of 120°

Indentation depth of indenter: 20 μm

Indentation speed of indenter: 12.5 μm/sec

Unloading speed of indenter: 12.5 m/sec

—Rebound Resilience Coefficient (Re)—

The rebound resilience coefficient is determined by using Lupke rebound resilience tester in the environment of 23° C. according to JIS K6255 (1996).

—Average Particle Diameter of Hard Segment Aggregate (Average Particle Diameter of HS Aggregate)—

The average particle diameter of hard segment aggregates is measured according to the method described above.

(Evaluation of Physical Properties of Blade)

—Chipping Evaluation—

The cleaning blade formed in each of the examples is mounted on an image forming apparatus "DocuCentre-IV C5575 (manufactured by Fuji Xerox Co., Ltd.), and NF (normal force) is adjusted to 2.0 gf/mm, and W/A (working angle) is adjusted to 11°.

Chipping is evaluated by the image forming apparatus under a low-temperature low-humidity (10° C./15% RH) environment. Specifically, evaluation is made as follows.

First, a projection of 50 μm is provided at a position of the surface of the photoreceptor.

Next, the photoreceptor is rotated, and the tip of the blade is observed with a laser microscope VK-9500 manufactured by Keyence Corporation at each 25 cycles of the photoreceptor.

Then, the number of cycles of the photoreceptor when chipping occurs at the tip (that is, the contact part) of the blade is considered as the chipping cycle.

—Evaluation of Abrasion Amount, Local Abrasion Rate, Etc. of Blade—

The cleaning blade formed in each of the examples is mounted on an image forming apparatus "DocuCentre-IV C5575 (manufactured by Fuji Xerox Co., Ltd.), and NF (normal force) is adjusted to 2.0 gf/mm, and W/A (working angle) is adjusted to 11°.

An untransferred solid image is output on 20,000 sheets of A4-size paper (manufactured by Fuji Xerox Co., Ltd., C2r paper) by the image forming apparatus in a high-temperature high-humidity (28° C./85% RH) environment. Then, a 30% halftone image is output on 20,000 sheets of A4-size paper (manufactured by Fuji Xerox Co., Ltd., C2r paper) in a low-temperature low-humidity (10° C./15% RH) environment. Thus, images are output on a total of 40,000 sheets. Then, the abrasion amount at the blade tip and the local abrasion rate at the blade tip are measured as follows.

The abrasion amount at the blade tip is determined by observing a section profile using laser microscope VR-9500 manufacture by Keyence Corporation and measuring a sectional area of an abraded portion.

The local abrasion rate at the blade tip is derived by calculating an edge defect rate per unit length according to (width-direction length of a portion of local abrasion)÷total width).

—Image Evaluation—

The cleaning blade formed in each of the examples is mounted on an image forming apparatus "DocuCentre-IV C5575 (manufactured by Fuji Xerox Co., Ltd.), and NF (normal force) is adjusted to 2.0 gf/mm, and W/A (working angle) is adjusted to 11°.

An image with a 1% image density (solid image of 6.2 mm×1 mm on A4-size paper) is output on 2,000 sheets of A4-size paper (manufactured by Fuji Xerox Co., Ltd., C2r paper) by the image forming apparatus. In the image on the 2000th sheet, the occurrence of color streak image defects is evaluated by visual observation according to the following criteria.

A: No color streak is observed.

B: Slight color streaks are observed within an allowable range on the image

C: Unallowable color streaks are observed on the image.

TABLE 1

| | | | Example 1 | Example 2 | Example 3 | Example 4 | Example 5 | Example 6 |
|---|---|---|---|---|---|---|---|---|
| Material composition | High-molecular polyol | Type | Polyester polyol (Adipate) | Polyester polyol (Adipate) | Polyesier polyol (Adipate) | Polyesier polyol (Adipate) | Polyesier polyol (Adipate) | PTMG Polytetramethylene ether glycol |
| | | mol % | 45 | 35 | 30 | 35 | 48 | 45 |
| | Low-molecular polyol | Type | 1,4-BD | 1,4-BD | 1,4-BD | 1,4-BD | 1,4-BD | 1,4-BD |
| | | mol % | 55 | 65 | 70 | 65 | 52 | 55 |
| | Isocyanate | Type | MDI | MDI | MDI | MDI | MDI | MDI |
| | | mol % | 18 | 18 | 18 | 18 | 18 | 18 |
| | Crosslinking agent | Type | TMP | TMP | TMP | TMP | TMP | TMP |
| | | mol % | 0.8 | 0.7 | 0.5 | 1.2 | 0.8 | 1.5 |
| | Ratio of 1,4-BD relative to total polyol | | 55% | 65% | 70% | 65% | 52% | 55% |
| Production condition | Curing/manuring condition | | A | A | A | B | A | E |
| Evaluation of physical properties | 100% modulus M100 | MPa | 9.0 | 9.3 | 9.5 | 8 | 9.1 | 7.5 |
| | Indentation elastic modulus EIT | MPa | 23.1 | 23.8 | 24.2 | 20.7 | 23.3 | 18.5 |
| | Rebound resilience coefficient Re | % | 28 | 26 | 25 | 32 | 27 | 30 |
| | M100/Re | | 0.32 | 0.36 | 0.38 | 0.25 | 0.34 | 025 |
| | EIT/Re | | 0.82 | 0.91 | 0.97 | 0.65 | 0.86 | 0.62 |
| | Average particle diameter of HS aggregate | μm | 5.0 | 9.0 | 10.0 | 7.0 | 5.5 | 5.0 |
| Quality evaluation | Blade abrasion amount | μm$^2$ | 3.2 | 2.9 | 2.5 | 4 | 35 | 4 |
| | Chipping cycle | Number of cycles | 300 | 275 | 200 | 325 | 275 | 325 |
| | Local abrasion rate | % | 0.25 | 0.22 | 0.18 | 0.30 | 0.27 | 0.30 |
| | Image evaluation | | A | A | A | B | B | B |

| | | | Example 7 | Comparative Example 1 | Comparative Example 2 | Comparative Example 3 | Comparative Example 4 |
|---|---|---|---|---|---|---|---|
| Material composition | High-molecular polyol | Type | Polyester polyol (Adipate) | Polyester polyol (Adipate) | Polyester polyol (Adipate) | Polyester polyol (Adipate) | Polyester polyol (Adpate) |
| | | mol % | 35 | 50 | 45 | 45 | 23 |
| | Low-molecular polyol | Type | 1,4-BD | 1,4-BD | 1,4-BD | 1,4-BD | 1,4-BD |
| | | mol % | 65 | 50 | 55 | 55 | 77 |
| | Isocyanate | Type | MDI | MDI | MDI | MDI | MDI |
| | | mol % | 18 | 18 | 18 | 18 | 18 |
| | Crosslinking agent | Type | TMP | TMP | TMP | TMP | TMP |
| | | mol % | 1.5 | 0.8 | 1.3 | 2 | 0.3 |
| | Ratio of 1,4-BD relative to total polyol | | 65% | 50% | 55% | 55% | 77% |
| Production condition | Curing/manuring condition | | E | A | C | D | E |
| Evaluation of physical properties | 100% modulus M100 | MPa | 7 | 9 | 7 | 9 | 9.8 |
| | Indentation elastic modulus EIT | MPa | 28.0 | 23.1 | 18.4 | 23.1 | 24.9 |
| | Rebound resilience coefficient Re | % | 30 | 28 | 32 | 43 | 18 |
| | M100/Re | | 0.23 | 0.32 | 0.22 | 0.21 | 0.54 |
| | EIT/Re | | 0.93 | 0.82 | 0.57 | 0.54 | 1.39 |
| | Average particle diameter of HS aggregate | μm | 8.0 | 0.3 | 3.0 | 0.9 | 15.0 |
| Quality evaluation | Blade abrasion amount | μm$^2$ | 3.8 | 3.2 | 5 | 5 | 5 |
| | Chipping cycle | Number of cycles | 300 | 300 | 325 | 325 | 100 |
| | Local abrasion rate | % | 0.21 | 0.35 | 0.30 | 0.30 | 0.28 |
| | Image evaluation | | B | C | C | C | C |

The results described above indicate that the cleaning blades of the examples each having a 1,4-butanediol ratio of over 50 mol % relative to the total polyol components show a low local abrasion rate and suppress the local abrasion as compared with the cleaning blades of Comparative Example 1 having a 1,4-butandedil ratio of 50 mol % or less.

It is also found that the cleaning blades of the examples each having a 1,4-butanediol ratio of 75 mol % or less relative to the total polyol components show a small number of chipping cycles and suppress the occurrence of chipping as compared with the cleaning blades of Comparative Example 3 having a 1,4-butamediol ratio of over 75 mol %.

It is further found that the cleaning blades of the examples show a small abrasion amount and thus have high abrasion resistance.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cleaning blade comprising:
   a contact part coming into contact with a member to be cleaned,
   wherein the contact part is configured by a member containing polyurethane rubber produced by polymerizing at least a polyol component, which contains over 50 mol % and 75 mol % or less of 1,4-butanediol relative to entire polyol components, with a polyisocyanate component;
   a ratio (M100/Re) of 100% modulus (M100 [MPa]) to rebound resilience coefficient (Re [%]) is 0.25 or more; and
   the rebound resilience coefficient (Re [%]) is 25% or more.

2. The cleaning blade according to claim 1, wherein the polyol component contains 55 mol % or more and 75 mol % or less of 1,4-butanediol relative to the entire polyol components.

3. The cleaning blade according to claim 2, wherein the polyol component contains 55 mol % or more and 60 mol % or less of 1,4-butanediol relative to the entire polyol components.

4. The cleaning blade according to claim 1, wherein the polyurethane rubber has a hard segment and a soft segment, and an average particle diameter of aggregates of the hard segment is 1 μm or more and 10 μm or less.

5. The cleaning blade according to claim 4, wherein the polyurethane rubber has a hard segment and a soft segment, and the average particle diameter of aggregates of the hard segment is 1 μm or more and 5 μm or less.

6. A process cartridge comprising:
   a cleaning device including the cleaning blade according to claim 1,
   wherein the process cartridge is detachable from an image forming apparatus.

7. An image forming apparatus comprising:
   an image holding member:
   a charging device that charges the image holding member:
   an electrostatic latent image forming device that forms an electrostatic latent image on the charged surface of the image holding member;
   a developing device that develops the electrostatic latent image formed on a surface of the image holding member with a toner to form a toner image:
   a transfer device that transfers the toner image formed on the image holding member to a recording medium; and
   a cleaning device that cleans the surface of the image holding member by bringing the cleaning blade according to claim 1 into contact with the surface after the toner image is transferred by the transfer device.

8. A cleaning blade comprising:
   a contact part coming into contact with a member to be cleaned,
   wherein the contact part is configured by a member containing polyurethane rubber produced by polymerizing at least a polyol component, which contains over 50 mol % and 75 mol % or less of 1,4-butanediol relative to entire polyol components, with a polyisocyanate component;
   a ratio (EIT/Re) of indentation elastic modulus (EIT [MPa]) to rebound resilience coefficient (Re [%]) is 0.65 or more; and
   the rebound resilience coefficient (Re [%]) is 25% or more.

9. The cleaning blade according to claim 8, wherein the polyol component contains 55 mol % or more and 75 mol % or less of 1,4-butanediol relative to the entire polyol components.

10. The cleaning blade according to claim 9, wherein the polyol component contains 55 mol % or more and 60 mol % or less of 1,4-butanediol relative to the entire polyol components.

11. The cleaning blade according to claim 8, wherein the polyurethane rubber has a hard segment and a soft segment, and an average particle diameter of aggregates of the hard segment is 1 μm or more and 10 μm or less.

12. The cleaning blade according to claim 11, wherein the polyurethane rubber has a hard segment and a soft segment, and the average particle diameter of aggregates of the hard segment is 1 μm or more and 5 μm or less.

13. A process cartridge comprising:
   a cleaning device including the cleaning blade according to claim 8,
   wherein the process cartridge is detachable from an image forming apparatus.

14. An image forming apparatus comprising:
   an image holding member:
   a charging device that charges the image holding member:
   an electrostatic latent image forming device that forms an electrostatic latent image on the charged surface of the image holding member;
   a developing device that develops the electrostatic latent image formed on a surface of the image holding member with a toner to form a toner image:
   a transfer device that transfers the toner image formed on the image holding member to a recording medium; and
   a cleaning device that cleans the surface of the image holding member by bringing the cleaning blade according to claim 6 into contact with the surface after the toner image is transferred by the transfer device.

* * * * *